Oct. 11, 1932.  L. G. COPEMAN  1,882,209
SHARP FREEZING STRUCTURE

Filed Sept. 30, 1929

INVENTOR.
LLOYD G. COPEMAN
BY
ATTORNEY.

Patented Oct. 11, 1932

1,882,209

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

SHARP FREEZING STRUCTURE

Application filed September 30, 1929. Serial No. 396,190.

This invenion relates to sharp freezing structure for automatic refrigerating systems, and has to do particularly with a novel means or structure for materially preventing the frosting up of a sharp freezing unit.

The problem of defrosting has become one of the most important problems in the mechanical refrigeration art, as the frosting and forming of ice on the walls of the evaporator or sharp freezing unit not only materially reduces the efficiency of the system but also makes it difficult at times to remove the ice cube tray. It has even been proposed to form the sharp freezing chamber as a completely isolated chamber so as not to be affected by the opening of the door of the food chamber.

It is the object of the present invention to provide a front wall or a front wall structure whereby to normally maintain the sharp freezing chambers substantially air tight and thus materially reduce the formation of frost and ice on the interior of the sharp freezing chambers.

A further object of the present invention resides in providing an apron formed of rubber or similar material adapted to be readily secured to the front wall of the sharp freezing unit and so formed as to permit readily removal of the ice cube trays but to normally exclude substantially all air from the sharp freezing compartments, the apron itself being readily removable from the unit whereby to permit shaking off of any ice which might be formed thereon.

Figure 1:
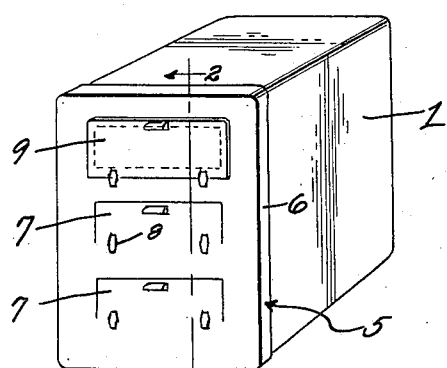
Fig. 1 is a perspective view of the preferred embodiment of the present invention and illustrating the rubber apron secured to the front of the sharp freezing unit.

This application is a continuation in part of my Patent No. 1,777,483 of October 7, 1930.

The present invention may be readily adapted to substantially any sharp freezing unit regardless of any peculiarities of structure or design. In the embodiment shown in the drawing, the sharp freezing unit is shown as at 1, but it will be understood that any shape of sharp freezing unit may enter into the embodiment of the invention.

Figure 2:
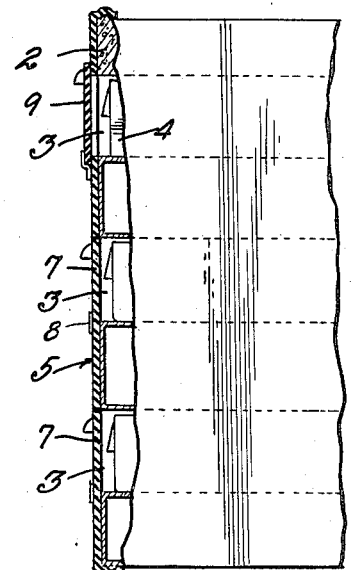
Fig. 2 is a side elevation, partly in section, of the structure shown in Fig. 1.

The sharp freezing unit may be formed of stone, as shown at 2 in Fig. 2, or may be the regular brine type unit or unit of the flooded type. Regardless of the type, the sharp freezing unit will, of necessity, have certain walls, or coils defining walls, together with suitable apertures 3 for receiving the ice cube trays 4.

While the frosting of the side walls of the sharp freezing unit 1 is detrimental the more serious frosting is that which occurs within and around the front of the sharp freezing chambers. To prevent this I preferably enclose the entire front of the unit with an apron which is generally designated 5.

This apron 5 is preferably formed of a high grade of thin Pará rubber and is provided around its edge with an inwardly extending flange 6 which is adapted to secure the rubber apron to the unit. If desired, the edge of the unit may be formed with a suitable bead, as shown in Fig. 2, whereby to more securely hold the rubber apron in position.

Suitable doors 7 are cut from the apron itself, as best shown in Figs. 1 and 2, so as to permit removal of the ice cube trays 4. These doors may be provided with suitable reinforcing hinges 8, or if desired, the doors of the sharp freezing chambers may be constructed as at 9 so as to provide a flap entirely around the opening in the apron.

Regardless of the form of the door, it will be obvious that the front of the sharp freezing unit will be substantially sealed so that frequent opening and closing of the food chamber door will have little effect on the interior of the sharp freezing chambers. In the course of time frost and a thin layer of ice may form upon the rubber apron itself, but this can be easily removed by simply removing the rubber apron and shaking or distorting the same, whereby the ice will readily drop from the apron which can then be quickly replaced. The ice cube tray may be readily removed at any time merely by opening the doors formed in the apron and if the unit should be run for an exceptionally long time without defrosting or should the trays become stuck to the side walls, it will be obvious that the doors will permit of inserting suitable tools for loosening the trays.

Figure 3:
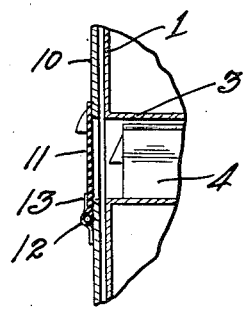
Fig. 3 is a fragmentary sectional view illustrating a modified embodiment of the invention.

A slightly modified form of the invention is shown embodied in Fig. 3, wherein the brine tank 1 is provided with a standard ornamental front member or cover 10. Such a cover is usually found in most commercial refrigerating units and may be formed integrally with or positioned directly against the evaporator or brine tank or may be spaced slightly in front thereof, as shown in Fig. 3. In this modification, the ice tray is preferably completely positioned within the sharp freezing chamber and the opening in the front member 10 is preferably closed by a suitable rubber closure member 11, which in turn may be suitably hinged as at 12. This closure member 11 is preferably slightly larger than the opening in the front piece 10 and may be held closed by means of a suitable spring member 13. Regardless of the condition of the unit, the rubber closure member 11 may always be readily distorted or opened to permit access to the sharp freezing chamber. Such closure member 11 may, of course, be formed of other materials, or even of metal, but I prefer to use rubber or its equivalent because of the fact that ice will not readily adhere to rubber.

Figure 4:
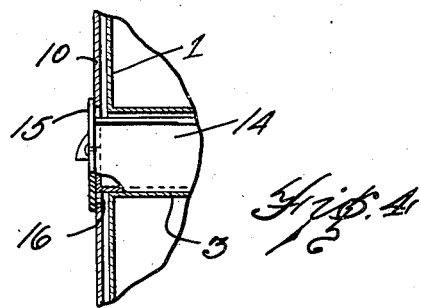
Fig. 4 is a fragmentary sectional view illustrating a further embodiment of the invention.
Figure 5:
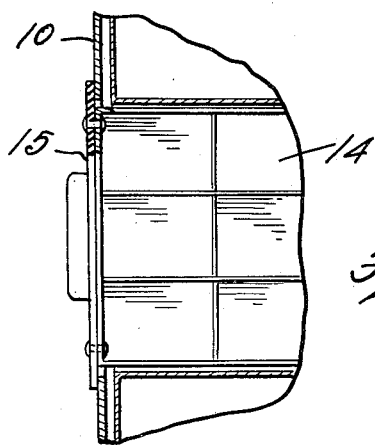
Fig. 5 is a fragmentary sectional plan view of the structure shown in Fig. 4.

A further modified embodiment is illustrated in Figs. 4 and 5 wherein the ice cube tray 14 preferably extends past the front cover 10. The front end of this ice tray is preferably secured to a suitable cover plate 15 which is large enough to cover the opening 16 formed in the member 10. The ice cube tray 14 may be formed of rubber, in which case the cover plate 15 is preferably formed integrally therewith, or in case the ice cube tray is formed of metal, the cover plate 15 is preferably formed of rubber and suitably secured thereto.

In this construction, it will be obvious that the cover plate 15 will always be readily removable or broken away from the member 10 even if frost or ice should form thereon, and in case the tray 14 should become stuck to the interior of the sharp freezing chamber, it will be obvious that the edges of the rubber cover plate 15 may be turned up and a suitable instrument inserted to assist in loosening the tray.

It will thus be seen that in each of the embodiments illustrated, the sharp freezing chambers of the cooling unit will be substantially isolated from the surrounding atmosphere within the cooling unit or refrigerating box and that the cover plate or door member, as the case may be, will always be readily removable, even if it should be coated with frost or ice, due to the fact that it is formed of rubber.

It will be understood that the front members 10 in Figs. 3, 4, and 5 may also be formed of rubber corresponding to the apron 5 in Fig. 1. In such case it will be obvious that the plate 15 may be formed of metal, the point being that one of said surfaces may be formed of metal and the other of material to which ice does not readily adhere.

What I claim is:

1. A sharp freezing unit, for freezing ice cubes and the like, comprising a main body member through which the transfer of heat is effected and one or more sharp freezing chambers for receiving the object to be cooled, and sealing means directly supported by said main body member for normally substantially sealing the sharp freezing chamber or chambers, comprising a closure member independent of said object to be cooled for closing the opening of the sharp freezing chamber, said closure member being formed of rubber.

2. A sharp freezing unit comprising a main body having a sharp freezing chamber, a front member for the unit, an opening in said front member registering with said sharp freezing chamber, and a closure plate, for said opening, contacting with and carried by said front member to seal the sharp freezing chamber, one of said contacting surfaces being formed of a non-metallic material to which ice does not readily adhere.

3. A sharp freezing unit comprising a main body having one or more sharp freezing chambers and a rubber cover member secured to the front of said unit and tending to normally seal the same from the surrounding atmosphere.

4. A sharp freezing unit comprising a main body having one or more sharp freezing chambers and a rubber cover member secured to the front of said unit and tending to normally seal the chambers from the surrounding atmosphere, said cover member being provided with one or more door members registering with said sharp freezing chamber or chambers.

5. A sharp freezing unit comprising a main body having one or more sharp freezing chambers and a rubber cover member secured to the front of said unit and tending to normally seal the chambers from the surrounding atmosphere, said cover member being provided with one or more door members registering with said sharp freezing chamber or chambers, the rubber cover member and doors being readily removable as a unit whereby to quickly remove any ice formed thereon.

6. A sharp freezing unit comprising a main body member provided with one or more openings and a door member hinged to the front of said unit and normally closing the opening therein, said door member contacting with the front of said unit and one of said contacting surfaces being formed of a non-metallic material to which ice does not readily adhere.

7. A sharp freezing unit comprising a main body member provided with one or more openings and a door member hinged to the front of said unit and normally closing the opening therein, said door member being formed of rubber whereby to evenly contact with the front of said unit to seal the same but to be readily removed therefrom.

8. A sharp freezing unit, comprising a sharp freezing chamber formed therein, and a closure member contacting with the front of said unit for normally sealing said sharp freezing chamber, one of the contacting surfaces being formed of rubber.

9. A sharp freezing unit comprising a main body having a sharp freezing chamber, a rubber cover member positioned at the front of said unit, an opening in said cover member registering with said sharp freezing chamber, and a closure member for said opening and contacting with said cover member to seal the sharp freezing chamber.

In testimony whereof I affix my signature.

LLOYD G. COPEMAN.